(12) United States Patent
Chen et al.

(10) Patent No.: US 11,616,531 B2
(45) Date of Patent: Mar. 28, 2023

(54) ECHO CANCELLING SYSTEM AND ECHO CANCELLING METHOD

(71) Applicant: Realtek Semiconductor Corporation, Hsinchu (TW)

(72) Inventors: Yun-Tse Chen, Hsinchu (TW); Hsuan-Ting Ho, Hsinchu (TW); Liang-Wei Huang, Hsinchu (TW); Kuei-Ying Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 189 days.

(21) Appl. No.: 17/111,824

(22) Filed: Dec. 4, 2020

(65) Prior Publication Data

US 2021/0367640 A1    Nov. 25, 2021

(30) Foreign Application Priority Data

May 25, 2020  (TW) .................................. 109117388

(51) Int. Cl.
*H04B 3/23*        (2006.01)
*H04M 9/08*       (2006.01)

(52) U.S. Cl.
CPC ............ *H04B 3/235* (2013.01); *H04M 9/082* (2013.01)

(58) Field of Classification Search
None
See application file for complete search history.

(56) References Cited

U.S. PATENT DOCUMENTS

| 4,878,232 A | * | 10/1989 | Fisher | ..................... H04B 3/235 375/362 |
| 5,553,014 A | * | 9/1996 | De Leon, II | .......... H04M 9/082 708/322 |
| 6,944,289 B2 | | 9/2005 | Tahernezhaadi et al. | |

* cited by examiner

*Primary Examiner* — Walter J Divito
(74) *Attorney, Agent, or Firm* — Locke Lord LLP; Tim Tingkang Xia, Esq.

(57) ABSTRACT

An echo cancelling system includes a data transmitter circuit and an echo canceller circuit. The data transmitter circuit is configured to receive a first transmitted signal. The first transmitted signal has a first sampling rate. The echo canceller circuit is configured to generate a second transmitted signal according to the first transmitted signal. The second transmitted signal has a second sampling rate. The second sampling rate is greater than the first sampling rate. The echo canceller circuit is further configured to generate an echo cancelling signal according to the second transmitted signal. The data transmitter circuit is further configured to generate an output signal according to a received signal and the echo cancelling signal.

20 Claims, 3 Drawing Sheets

ECHO CANCELLING SYSTEM AND ECHO CANCELLING METHOD

RELATED APPLICATIONS

This application claims priority to Taiwanese Application Serial Number 109117388, filed May 25, 2020, which is herein incorporated by reference.

BACKGROUND

Technical Field

The present disclosure relates to a communication technology. More particularly, the present disclosure relates to an echo cancelling system and an echo cancelling method.

Description of Related Art

With development of communication technology, various communication systems are developed and are used in different applications. In a full-duplex system, signals with different directions (inward and outward) are transmitted via a pair of transmission lines respectively. When the impedances of the pair of transmission lines are not matched or the hybrid architecture design of the receiver is improper, the transmitted signal (outward) may be introduced into the received signal (inward). Such echoes can affect the signal-to-noise ratio (SNR) of the communication system.

SUMMARY

One embodiment of the present disclosure is related to an echo cancelling system. The echo cancelling system includes a data transmitter circuit and an echo canceller circuit. The data transmitter circuit is configured to receive a first transmitted signal. The first transmitted signal corresponds to a first sampling rate. The echo canceller circuit is configured to generate a second transmitted signal according to the first transmitted signal. The second transmitted signal corresponds to a second sampling rate. The second sampling rate is higher than the first sampling rate. The echo canceller circuit is further configured to generate an echo cancelling signal according to the second transmitted signal. The data transmitter circuit is further configured to generate an output signal according to a received signal and the echo cancelling signal.

One embodiment of the present disclosure is related to an echo cancelling system. The echo cancelling system includes a data transmitter circuit and an echo canceller circuit. The data transmitter circuit is configured to receive a first transmitted signal. The echo canceller circuit includes a first filter, a second filter, and a digital-to-analog converter circuit. The first filter is configured to generate a first filtering signal according to the first transmitted signal. A combination of the first filtering signal and a random sequence signal forms a first digital signal. The second filter is configured to generate a second filtering signal according to the first transmitted signal. The digital-to-analog converter circuit is configured to generate an echo cancelling signal based on the first transmitted signal and a shaping signal corresponding to the first digital signal and the second filtering signal. The data transmitter circuit is further configured to generate an output signal according to a received signal and the echo cancelling signal.

One embodiment of the present disclosure is related to an echo cancelling method. The echo cancelling method includes the following steps: receiving a first transmitted signal by a data transmitter circuit, in which the first transmitted signal corresponds to a first sampling rate; generating a second transmitted signal according to the first transmitted signal by an echo cancelling circuit, in which the second transmitted signal corresponds to a second sampling rate, and the second sampling rate is higher than the first sampling rate; generating an echo cancelling signal according to the second transmitted signal by the echo cancelling circuit; and generating an output signal according to a received signal and the echo cancelling signal by the data transmitter circuit.

As shown in the above embodiments, in the echo cancelling system and the echo cancelling method of the present disclosure, the echo cancelling circuit can generate the echo cancelling signal according to a signal with a higher sampling rate. Thus, the signal-to-noise ratio of the echo cancelling system is improved since more noises are cancelled.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may be referred to "electrically connected" or "electrically coupled." "Connected" or "coupled" may also be referred to operations or actions between two or more elements.

Figure 1:
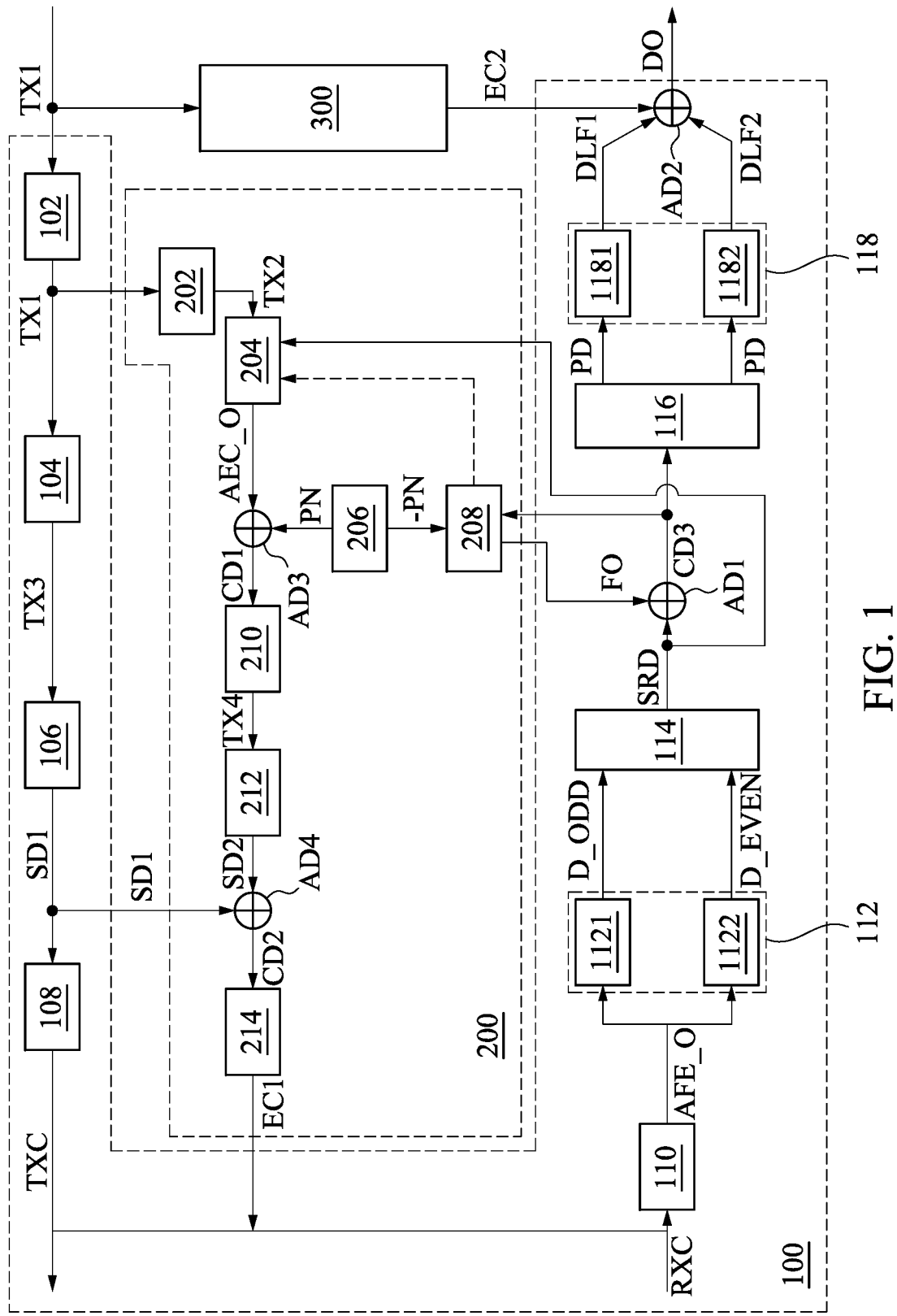
FIG. 1 is a schematic diagram illustrating an echo cancelling system according to some embodiments of the present disclosure.

Reference is made to FIG. 1. FIG. 1 is a schematic diagram illustrating an echo cancelling system S1 according to some embodiments of the present disclosure. In some embodiments, the echo cancelling system S1 is applied to an Ethernet system.

In some embodiments, the echo cancelling system S1 adopts Full-Duplex technology. In other words, a pair of transmissions lines is used in the system. One of the transmissions lines carries the transmitted signals and another carries the received signals. As shown in FIG. 1, a transmitted signal TX1 illustrates the transmitted signal of the echo cancelling system S1. A received signal RXC illustrates the received signal of the echo cancelling system S1. In some embodiments, the transmitted signal TX1 is generated by encoding a signal from the Media Access Control (MAC) layer, but the present disclosure is not limited thereto.

As illustrated in FIG. 1, the echo cancelling system S1 includes a data transmitter circuit 100, an echo canceller circuit 200, and an echo canceller circuit 300. In some embodiments, the echo canceller circuit 200 is configured to generate an echo cancelling signal EC1 in order to cancel most of the echoes at the analog side of the system. The echo canceller circuit 300 is configured to generate an echo cancelling signal EC2 in order to cancel the residual echoes at the digital side of the system.

To be more specific, the data transmitter circuit 100 receives the transmitted signal TX1. The transmitted signal TX1 corresponds to a first sampling rate (for example, 400 MHz). The echo canceller circuit 200 receives the transmitted signal TX1 and performs an oversampling process on the transmitted signal TX1 to generate a transmitted signal TX2. The transmitted signal TX2 corresponds to a second sampling rate, and the second sampling rate (for example, 800 MHz) is higher than the first sampling rate. The echo canceller circuit 200 generates the echo cancelling signal EC1 according to the transmitted signal TX2. Then, the data transmitter circuit 100 generates an output signal DO according to an analog signal TXC, the received signal RXC, and the echo cancelling signals EC1 and EC2. With the echo cancelling signals EC1 and EC2, echoes can be cancelled and the signal-to-noise ratio (SNR) of the echo cancelling system S1 can be increased.

In some embodiments, the data transmitter circuit 100 includes a memory 102, an oversampling circuit 104, a shaping circuit 106, a digital-to-analog converter (DAC) 108, an analog front-end processor circuit 110, an analog-to-digital converter circuit 112, a parallel-to-serial converter circuit 114, an adder AD1, and a serial-to-parallel converter circuit 116, a filter circuit 118, and an adder AD2. The analog-to-digital converter (ADC) circuit 112 includes an analog-to-digital converter 1121 and an analog-to-digital converter 1122. The filter circuit 118 includes a filter 1181 and a filter 1182.

In some embodiments, the echo canceller circuit 200 includes an oversampling circuit 202, a filter circuit 204, an adder AD3, a random sequence generator circuit 206, a filter circuit 208, an oversampling circuit 210, a shaping circuit 212, an adder AD4, and a digital-to-analog converter 214.

The memory 102 is operated to receive the transmitted signal TX1. In some embodiments, the memory 102 is implemented by a register which can perform a first-in-first-out (FIFO) process, but the present disclosure is not limited thereto. Then, the memory 102 transmits the transmitted signal TX1 to the oversampling circuit 104 and the oversampling circuit 202.

The oversampling circuit 104 performs an oversampling process on the transmitted signal TX1 to generate a transmitted signal TX3. The transmitted signal TX3 corresponds to a third sampling rate, and the third sampling rate (for example, 1.6 GHz) is higher than the second sampling rate. The shaping circuit 106 generates a shaping signal SD1 according to the transmitted signal TX3. The digital-to-analog converter 108 converts the shaping signal SD1 with the digital form into the analog signal TXC with the analog form. The analog signal TXC may be processed by a power converter and then outputted to a network cable or some electrical devices.

On the other hands, the oversampling circuit 202 performs an oversampling process on the transmitted signal TX1 to generate the transmitted signal TX2. As described above, the transmitted signal TX2 corresponds to the second sampling rate. Then, the filter circuit 204 may utilize the filtered least mean squared (FxLMS) mechanism to perform a filtering process on the transmitted signal TX2, to generate a filtering signal AEC_O. The random sequence generator circuit 206 generates a random sequence signal PN. In some embodiments, the random sequence signal PN is a pseudo-noise sequence, but the present disclosure is not limited thereto. The adder AD3 combines the filtering signal AEC_O and the random sequence signal PN to generate a calculation signal CD1. The oversampling circuit 210 performs an oversampling process on the calculation signal CD1 to generate a transmitted signal TX4. The transmitted signal TX4 corresponds to the third sampling rate. In other words, transmitted signal TX4 and the transmitted signal TX3 have the same sampling rate. The shaping circuit 212 generates a shaping signal SD2 according to the transmitted signal TX4. The adder AD4 combines the shaping signal SD2 and the shaping signal SD1 to generate a calculation signal CD2. The digital-to-analog converter 214 converts the calculation signal CD2 with the digital form into the echo cancelling signal EC1 with the analog form.

In some embodiments, if the analog signal TXC is introduced into the transmission line that carries the received signal, echoes can be generated. In other words, the analog front-end processor circuit 110 receives the analog signal TXC. The analog front-end processor circuit 110 generates a processing signal AFE_O according to the analog signal TXC, the echo cancelling signal EC1 from the echo canceller circuit 200, and the received signal RXC. The processing signal AFE_O also corresponds to the third sampling rate. The analog-to-digital converter circuit 112 generates a digital signal D_ODD and a digital signal D_EVEN according to the processing signal AFE_O. In some embodiments, the digital signal D_ODD can be generated by the analog-to-digital converter 1121 that operates at the first sampling rate to sample the processing signal AFE_O with a first phase (e.g., an odd phase). The digital signal D_EVEN can be generated by the analog-to-digital converter 1122 that operates at the first sampling rate to sample the processing signal AFE_O with a second phase (e.g., an even phase). Then, the parallel-to-serial converter circuit 114 converts the digital signal D_ODD and the digital signal D_EVEN with the parallel form into a series signal SRD with the series form.

In addition, an inversion process can be applied to the random sequence signal PN to generate an inverted random sequence signal −PN. The filter circuit 208 generates a filtering signal FO according to the inverted random sequence signal −PN. The adder AD1 combines the filtering signal FO and the series signal SRD with the series form in order to generate a calculation signal CD3 with the series form. The serial-to-parallel converter circuit 116 converts the calculation signal CD3 with the series form into a parallel signal PD with the parallel form. The filter 1181 operates at the first sampling rate and samples the parallel signal PD with the first phase (e.g., the odd phase) to generate a filtering signal DLF1. The filter 1182 operates at the first sampling rate and samples the parallel signal PD with the second phase (e.g., the even phase) to generate a filtering signal DLF2. In some embodiments, the filter 1181 and the filter 1182 may be implemented by low-pass filters, but the present disclosure is not limited thereto. The adder AD2 combines the filtering signal DLF1, the filtering signal DLF2, and the echo cancelling signal EC2 to generate the output signal DO.

In some embodiments, the FxLMS mechanism of the filter circuit 204 is updated based on the transmitted signal TX2, the series signal SRD with the series form (which can reflect errors) and the filter circuit 208 (e.g., filter coefficients), such that the echo canceller circuit 200 can generate the echo cancelling signal EC1 which can effectively cancel echo, to increase the SNR of the echo cancelling system S1.

In some related approaches, the echo cancelling circuit generates the echo cancelling signal according to a signal corresponding to a lower sampling rate. In these related approaches, the echo cancelling signal cannot effectively cancel echoes and increase the SNR of the system.

In the present disclosure, the echo canceller circuit 200 generates the echo cancelling signal EC1 according to the transmitted signal TX2 corresponding to a higher sampling rate (the second sampling rate, for example, 800 MHz). Thus, the echo cancelling signal EC1 can be utilized to effectively cancel echo such that the SNR of the echo cancelling system S1 can be effectively increased.

In addition, the sampling rate of the transmitted signal TX2 is determined according to the sampling rate of the processing signal AFE_O outputted from the analog front-end processor circuit 110. In some embodiments, if the processing signal AFE_O corresponds to the third sampling rate, the second sampling rate of the transmitted signal TX2 outputted from the oversampling circuit 202 may be set to a half of the third sampling rate or a value lower than the third sampling rate. Thus, it can cancel most of the echoes and avoid high system costs. In some other embodiments, the second sampling rate can be identical to the third sampling rate to cancel more echoes.

Figure 2:
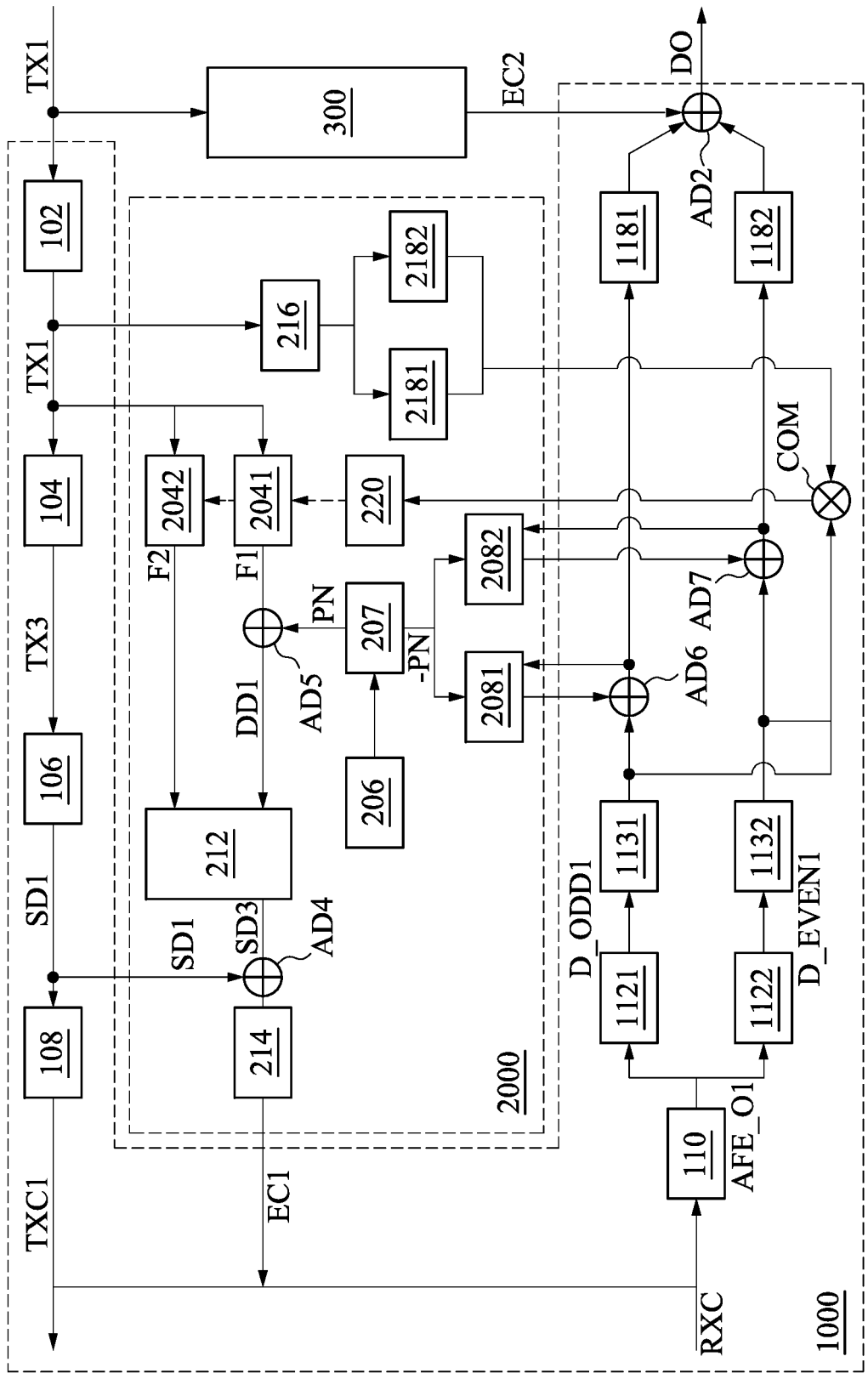
FIG. 2 is a schematic diagram illustrating an echo cancelling system according to some embodiments of the present disclosure.

Reference is made to FIG. 2. FIG. 2 is a schematic diagram illustrating an echo cancelling system S2 according to some embodiments of the present disclosure. The echo cancelling system S2 in FIG. 2 is a poly-phase system.

To be more specific, a major difference between the echo cancelling system S2 in FIG. 2 and the echo cancelling system S1 in FIG. 1 is that the data transmitter circuit 1000 of the echo cancelling system S2 includes a memory 1131 and a memory 1132. The echo canceller circuit 2000 of the echo cancelling system S2 includes a filter 2041 (may be included in the filter circuit 204 in FIG. 1), a filter 2042 (may be included in the filter circuit 204 in FIG. 1), a memory 207, a filter 2081 (may be included in the filter circuit 208 in FIG. 1), a filter 2082 (may be included in the filter circuit 208 in FIG. 1), a memory 216, a filter 2181 and a filter 2182. In some embodiments, the memory 1131, the memory 1132, the memory 207, and the memory 216 may be implemented by registers which can perform the FIFO process, but the present disclosure is not limited thereto.

The filter 2041 and the filter 2042 receive the transmitted signal TX1, and the filter 2041 performs a filtering process on the transmitted signal TX1 according to the first phase (e.g., the odd phase) in order to output a filtering signal F1. The filter 2042 performs a filtering process on the transmitted signal TX1 according to the second phase (e.g., the even phase), to output a filtering signal F2. The random sequence generator circuit 206 generates the random sequence signal PN. The adder AD5 combines the filtering signal F1 and the random sequence signal PN to generate a digital signal DD1. The shaping circuit 212 generates a shaping signal SD3 according to the digital signal DD1 and the filtering signal F2. The digital-to-analog converter 214 generates the echo cancelling signal EC1 based on a combination of the shaping signal SD3 and the transmitted signal TX1. The analog front-end processor circuit 110 generates a processing signal AFE_O1 according to the analog signal TXC1 corresponding to the transmitted signal TX1, the echo cancelling signal EC1 and the received signal RXC. The analog-to-digital converter circuit 1121 samples the processing signal AFE_O1 with the first phase (e.g., the odd phase) to generate a digital signal D_ODD1. The analog-to-digital converter circuit 1122 samples the processing signal AFE_O1 with the second phase (e.g., the even phase) to generate the digital signal D_EVEN1.

On the other hands, the memory 207 outputs the inverted random sequence signal −PN to the filter 2081 and the filter 2082. The filter 2081 is coupled to the memory 1131 through an adder AD6. The filter 2082 is coupled to the memory 1132 through an adder AD7. The filter 2081, the memory 1131 and the analog-to-digital converter 1121 are corresponding to the first phase (e.g., the odd phase). The filter 2082, the memory 1132 and the analog-to-digital converter 1122 are corresponding to the second phase (e.g., the even phase). In some embodiments, the filter 2081 is updated according to an output of the adder AD6 and the filter 2082 is updated according to an output of the adder AD7.

In addition, the memory 216 transmits the transmitted signal TX1 to the filter 2181 and the filter 2182. An output of the filter 2181 and an output of the filter 2182 can be controlled based on the filter coefficients of the filter 2081 and the filter coefficients the filter 2082 respectively (e.g., through a path from the filter circuit 208 to the filter circuit 204 in FIG. 1). A combination circuit COM updates, via an update circuit 220, the FxLMS mechanism of the filter 2041 and the filter 2042 according to an output of the memory 1131, an output of the memory 1132, an output of the filter 2181 and an output of the filter 2182.

As described above, the echo cancelling system S2 in FIG. 2 adopts the poly-phase system. In other words, the echo cancelling system S2 processes signals with different phases separately. Thus, all or most of elements can be operated under a lower frequency to save power. In addition, since the echo cancelling system S2 adopts the poly-phase system, the circuit design can be more flexible. For example, it is easier to remove paths corresponding to one of the phases based on the design (e.g., the odd phase or the even phase).

Figure 3:
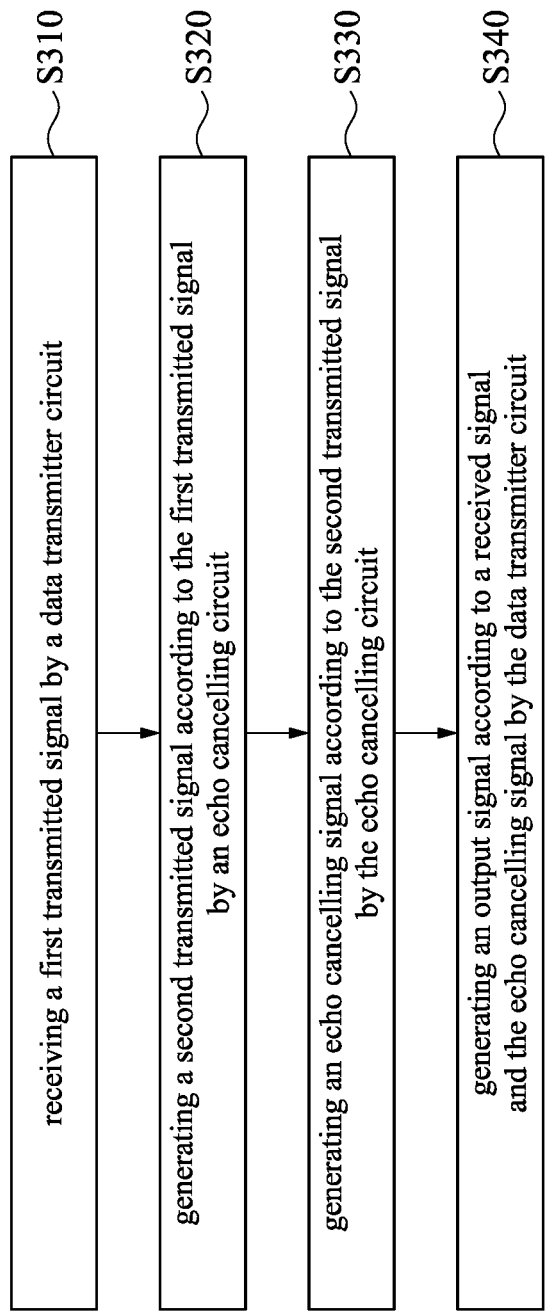
FIG. 3 is a flow diagram illustrating an echo cancelling method according to some embodiments of the present disclosure.

Reference is made to FIG. 3. FIG. 3 is a flow diagram illustrating an echo cancelling method 3000 according to some embodiments of the present disclosure. The echo cancelling method 3000 includes operations S310, S320, S330, and S340.

In some embodiments, the echo cancelling method 3000 is applied to the echo cancelling system S1 in FIG. 1, but the present disclosure is not limited thereto. For better understanding, the echo cancelling method 3000 is explained with reference to the echo cancelling system S1 in FIG. 1.

In operation S310, the data transmitter circuit 100 receives the transmitted signal TX1. The transmitted signal TX1 corresponds to the first sampling rate.

In operation S320, the echo canceller circuit 200 generates the transmitted signal TX2 according to the transmitted signal TX1. The transmitted signal TX2 corresponds to the second sampling rate and the second sampling rate is higher than the first sampling rate. In some embodiments, the oversampling circuit 202 performs the oversampling process on the transmitted signal TX1 to generate the transmitted signal TX2. The sampling rate of the transmitted signal TX2 may be twice the sampling rate of the transmitted signal TX1 or even higher.

In operation S330, the echo canceller circuit 200 generates the echo cancelling signal EC1 according to the transmitted signal TX2. Since the transmitted signal TX2 corresponds to the higher sampling rate (i.e., the second sampling rate), the echo canceller circuit 200 can generate the echo cancelling signal EC1 which is more effective on echo cancellation.

In operation S340, the data transmitter circuit 100 generates the output signal DO according to the received signal RXC and the echo cancelling signal EC1. In some embodiments, the echo cancelling signal EC1 can cancel most of the echoes at the analog side of the system in order to increase the SNR of the echo cancelling system S1.

In the present disclosure, echoes in the system can be effectively cancelled and increase the SNR of the system. In addition, the accuracy of the effective number of bits (ENOB) of the system also can be reduced to save system costs. In addition, the present disclosure can reduce requirements for signal jitter and be can operated in any interval.

As shown in the above embodiments, in the echo cancelling system and the echo cancelling method of the present disclosure, the echo cancelling circuit can generate the echo cancelling signal according to a signal with a higher sampling rate. Thus, the signal-to-noise ratio of the echo cancelling system is improved since more noises are cancelled.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An echo cancelling system, comprising:
a data transmitter circuit configured to receive a first transmitted signal, wherein the first transmitted signal corresponds to a first sampling rate; and
an echo canceller circuit configured to generate a second transmitted signal according to the first transmitted signal, wherein the second transmitted signal corresponds to a second sampling rate, and the second sampling rate is higher than the first sampling rate, the echo canceller circuit is further configured to generate an echo cancelling signal according to the second transmitted signal, and the data transmitter circuit is further configured to generate an output signal according to a received signal and the echo cancelling signal, wherein the received signal is different from the first transmitted signal.

2. The echo cancelling system of claim 1, wherein the second sampling rate is equal or greater than twice the first sampling rate.

3. The echo cancelling system of claim 1, wherein the data transmitter circuit comprises:
a first oversampling circuit configured to generate a third transmitted signal according to the first transmitted signal, wherein the third transmitted signal corresponds to a third sampling rate, wherein the third sampling rate is higher than the second sampling rate;
a first shaping circuit configured to generate a first shaping signal according to the third transmitted signal;
a first digital-to-analog converter configured to generate an analog signal according to the first shaping signal;
an analog front-end processor circuit configured to generate a processing signal according to the analog signal, the echo cancelling signal, and the received signal, wherein the processing signal corresponds to the third sampling rate; and
an analog-to-digital converter circuit configured to generate at least one digital signal according to the processing signal, wherein the output signal is generated based on the at least one digital signal.

4. The echo cancelling system of claim 3, wherein the second sampling rate is half the third sampling rate.

5. The echo cancelling system of claim 3, wherein the echo canceller circuit comprises:
a second oversampling circuit configured to generate the second transmitted signal according to the first transmitted signal;
a first filter circuit configured to perform a filtering process on the second transmitted signal to generate a first filtering signal;
a third oversampling circuit configured to generate a fourth transmitted signal according to the first filtering signal and a random sequence signal, wherein the fourth transmitted signal corresponds to the third sampling rate;
a second shaping circuit configured to generate a second shaping signal according to the fourth transmitted signal;
an adder configured to generate a calculation signal according to the first shaping signal and the second shaping signal; and
a second digital-to-analog converter configured to generate the echo cancelling signal according to the calculation signal.

6. The echo cancelling system of claim 5, wherein the echo canceller circuit further comprises:
a random sequence generator circuit configured to generate the random sequence signal; and
a second filter circuit configured to generate a second filtering signal according to an inverted random sequence signal corresponding to the random sequence signal,
wherein the first filter circuit is updated based on the at least one digital signal and the second filter circuit.

7. The echo cancelling system of claim 3, wherein the analog-to-digital converter circuit comprises:
a first analog-to-digital converter configured to generate a first digital signal according to the processing signal; and
a second analog-to-digital converter configured to generate a second digital signal according to the processing signal,
wherein the output signal is generated based on the first digital signal and the second digital signal.

8. The echo cancelling system of claim 7, wherein the first analog-to-digital converter or the second analog-to-digital converter operates according to the first sampling rate.

9. An echo cancelling system, comprising:
a data transmitter circuit configured to receive a first transmitted signal; and
an echo canceller circuit comprising:
a first filter configured to generate a first filtering signal according to the first transmitted signal, wherein a combination of the first filtering signal and a random sequence signal forms a first digital signal;

a second filter configured to generate a second filtering signal according to the first transmitted signal; and a digital-to-analog converter configured to generate an echo cancelling signal based on the first transmitted signal and a shaping signal corresponding to the first digital signal and the second filtering signal, wherein the data transmitter circuit is further configured to generate an output signal according to a received signal and the echo cancelling signal.

10. The echo cancelling system of claim 9, wherein the data transmitter circuit comprises:

an analog front-end processor circuit configured to generate a processing signal according to an analog signal corresponding to the first transmitted signal, the echo cancelling signal, and the received signal;

a first analog-to-digital converter corresponding to the first filter, wherein the first analog-to-digital converter is configured to generate a first digital signal according to the processing signal; and a second analog-to-digital converter corresponding to the second filter, wherein the second analog-to-digital converter is configured to generate a second digital signal according to the processing signal, and the output signal is generated based on the first digital signal and the second digital signal.

11. The echo cancelling system of claim 10, wherein the first filter is corresponding to a first phase and coupled to the first analog-to-digital converter via a first adder, wherein the second filter is corresponding to a second phase and coupled to the second analog-to-digital converter via a second adder.

12. The echo cancelling system of claim 9, wherein the echo cancelling system is a poly-phase system.

13. An echo cancelling method, comprising:

receiving a first transmitted signal by a data transmitter circuit, wherein the first transmitted signal corresponds to a first sampling rate;

generating a second transmitted signal according to the first transmitted signal by an echo cancelling circuit, wherein the second transmitted signal corresponds to a second sampling rate, and the second sampling rate is higher than the first sampling rate;

generating an echo cancelling signal according to the second transmitted signal by the echo cancelling circuit; and generating an output signal according to a received signal and the echo cancelling signal by the data transmitter circuit, wherein the received signal is different from the first transmitted signal.

14. The echo cancelling method of claim 13, wherein the second sampling rate is equal or greater than twice the first sampling rate.

15. The echo cancelling method of claim 13, further comprising:

generating a third transmitted signal according to the first transmitted signal by a first oversampling circuit, wherein the third transmitted signal corresponds to a third sampling rate, wherein the third sampling rate is higher than the second sampling rate;

generating a first shaping signal according to the third transmitted signal by a first shaping circuit;

generating an analog signal according to the first shaping signal by a first analog-to-digital converter;

generating a processing signal according to the analog signal, the echo cancelling signal, and the received signal by an analog front-end processor circuit, wherein the processing signal corresponds to the third sampling rate; and generating at least one digital signal according to the processing signal by an analog-to-digital converter circuit, wherein the output signal is generated based on the at least one digital signal.

16. The echo cancelling method of claim 15, wherein the second sampling rate is half the third sampling rate.

17. The echo cancelling method of claim 15, further comprising:

generating the second transmitted signal according to the first transmitted signal by a second oversampling circuit;

performing a filtering process on the second transmitted signal by a first filter circuit to generate a first filtering signal;

generating a fourth transmitted signal according to the first filtering signal and a random sequence signal by a third oversampling circuit, wherein the fourth transmitted signal corresponds to the third sampling rate;

generating a second shaping signal according to the fourth transmitted signal by a second shaping circuit;

generating a calculation signal according to the first shaping signal and the second shaping signal by an adder; and generating the echo cancelling circuit according to the calculation signal by a second digital-to-analog converter.

18. The echo cancelling method of claim 17, further comprising:

generating the random sequence signal by a random sequence generator circuit;

generating a second filtering signal according to an inverted random sequence signal corresponding to the random sequence signal by a second filter circuit; and updating the first filter circuit based on the at least one digital signal and the second filter circuit.

19. The echo cancelling method of claim 15, further comprising:

generating a first digital signal according to the processing signal by a first analog-to-digital converter; and generating a second digital signal according to the processing signal by a second analog-to-digital converter, wherein the output signal is generated based on the first digital signal and the second digital signal.

20. The echo cancelling method of claim 19, wherein the first analog-to-digital converter or the second analog-to-digital converter operates according to the first sampling rate.

* * * * *